US 6,797,803 B2

(12) United States Patent
Inoue et al.

(10) Patent No.: US 6,797,803 B2
(45) Date of Patent: Sep. 28, 2004

(54) RECYCLE PROCESS FOR POLYCONDENSATION RESINS

(75) Inventors: Kazushige Inoue, Moka (JP); Akio Ikeda, Otake (JP); Takato Kimura, Ichihara (JP); Tomoaki Shimoda, Ichihara (JP); Masahiko Tatsumi, Chiba (JP)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 10/372,892

(22) Filed: Feb. 24, 2003

(65) Prior Publication Data

US 2003/0229197 A1 Dec. 11, 2003

(30) Foreign Application Priority Data

Mar. 22, 2002 (JP) ........................................ 2002-081105

(51) Int. Cl.[7] .............................................. C08G 64/00
(52) U.S. Cl. .................... 528/196; 264/176.1; 264/219; 422/131; 528/198
(58) Field of Search ............................ 264/176.1, 219; 422/131, 135; 528/196, 198

(56) References Cited

U.S. PATENT DOCUMENTS

| 4,735,978 A | 4/1988 | Ishihara | |
| 5,225,130 A | 7/1993 | Deiringer | |
| 5,254,637 A | 10/1993 | Witzeman et al. | 525/386 |
| 5,354,841 A | 10/1994 | Geibel et al. | |
| 5,373,082 A | 12/1994 | Kauth et al. | |
| 6,022,943 A | 2/2000 | Inoue et al. | 528/196 |
| 6,262,218 B1 | 7/2001 | Inoue et al. | 528/196 |
| 6,271,290 B1 | 8/2001 | Inoue et al. | 524/145 |
| 6,303,735 B1 | 10/2001 | Shimoda et al. | 528/196 |
| 6,482,877 B2 | 11/2002 | Inoue et al. | 524/145 |
| 6,562,877 B2 * | 5/2003 | Al Ghatta | 521/48 |
| 2002/0095020 A1 | 7/2002 | Hucks et al. | 528/196 |
| 2002/0142115 A1 | 10/2002 | Sugiura | 428/35.2 |

FOREIGN PATENT DOCUMENTS

JP     6-220184     9/1994

OTHER PUBLICATIONS

Japanese Abstract for JP11152371A Sep. 1, 1998.
Japanese Abstract for JP07316280A May 23, 1994.
International Search Report, date of mailing Jul. 15, 2003.
Japanese Abstract JP02124934A Oct. 7, 1989.
Japanese Abstract JP63215763 Sep. 8, 1988.

* cited by examiner

Primary Examiner—Terressa Boykin

(57) ABSTRACT

A method of recycling fusible polycondensation resin waste in a fusion polymerization apparatus is disclosed. The method of recycling polycondensation resins comprises adding polycondensation resin waste directly to a fusion polymerization apparatus to carry out the polycondensation reaction. The polycondensation resin waste may be supplied from any point of the polycondensation apparatus to carry out the exchange reaction and/or the polycondensation reaction between the resin being prepared in the apparatus and the resin waste supplied. The method may be carried out in a continuous fusion polycondensation system with more than one polymerization reactor connected in series. The polycondensation resin waste may be supplied from the outlet of a polymerization reactor during the initial stage of the polycondensation process (oligomerisation process) to carry out the exchange reaction and/or the polycondensation reaction between the resin waste and the resin being prepared in the later stage of the polycondensation process in a continuous fusion polycondensation apparatus with more than one polymerization reactor connected in series.

30 Claims, 2 Drawing Sheets

RECYCLE PROCESS FOR POLYCONDENSATION RESINS

CROSS REFERENCE TO RELATED APPLICATIONS

The present application is a U.S. non-provisional application based upon and claiming priority from Japanese Application No. 2002-81105, with a filing date of Mar. 22, 2002, which is hereby incorporated by reference.

BACKGROUND

This disclosure relates to an economical method of recycling polycondensation resin waste. Polycondensation resins, such as polycarbonates, polyesters, polyamides, and polyarylates are materials with very a high economic value, currently being used in applications such as lenses, compact discs, construction materials, automobile parts, automobile chassis, office appliances, camera bodies, bottles, fibres, and the like. The demand for these resins is increasing. After use, the resins are often disposed of by burning them or burying them underground as waste. Recovery and recycling of these wastes is presently being examined from the viewpoint of environmental protection, economy, and reuse.

For example, some polycondensation resin wastes are used in partial remolding processes. Remolding, however, suffers from of lowering of the molecular weight, deterioration of physical properties such as strength, and discoloration of the material, all of which make large-scale reuse difficult. In addition, the material is usually discarded after only a single reuse. Thus, remolding is not recycling in the true sense.

Japanese Kokai Publication no. 6-220184 discloses a method of preparation of polycarbonate wherein polycarbonate waste is dissolved in monophenol and depolymerized (i.e., disintegrated) in the presence of a quaternary ammonium compound or quaternary phosphonium compound catalyst to form a mixture of oligocarbonate, diaryl carbonate and diphenol. The oligocarbonates obtained are then polycondensed.

Japanese Kokai Publication no. 7-316280 discloses a recycling method wherein the aromatic dihydroxy compounds or diaryl carbonates obtained by depolymerization of the aromatic polycarbonate resin waste were used as raw materials for the preparation of an aromatic polycarbonate resin. In this method, the aromatic dihydroxy compounds and diaryl carbonate compounds were recovered by a transesterification reaction between the aromatic polycarbonate waste and an aromatic monohydroxy compound, through the following steps. In Step 1, an aromatic polycarbonate resin and an aromatic monohydroxy compound were subjected to a transesterification reaction. In Step 2, the diaryl carbonate containing an aromatic monohydroxy compound was separated by distillation from the reaction product of Step 1. In Step 3, an aromatic monohydroxy compound was added to the aromatic dihydroxy compound left as residue in Step 2 and was heated to form an addition product, and the addition product was separated after deposition as crystals by cooling. In Step 4, the crystals obtained in Step 3 were heated and melted and the aromatic monohydroxy compound was distilled off to obtain an aromatic dihydroxy compound.

The methods described above, however, are disadvantegous in that the initially high molecular weight polymers are converted into oligomers or monomers using an energy-intensive process. This is particularly wasteful inefficient, since manufacture of the initial high molecular weight polymers is also an energy-intensive process.

Japanese Kokai Publication no. 11-152371 discloses a method of solid phase polymerization wherein the polycarbonate is not depolymerized. In this method, after dissolving the polycarbonate waste in a solvent, the dissolved polycarbonate component is crystallised. However, because this process requires solvent, it is not very satisfactory from the viewpoint of energy efficiency and environmental hygiene.

There thus remains a need for improved recycling methods for polycondensation resin waste.

SUMMARY

The above-described and other drawbacks are alleviated by a method of producing a polycondensation resin comprising adding a polycondensation resin waste to a fusion polymerisation apparatus maintained at a temperature and a pressure effective to produce the polycondensation resin, wherein the polycondensation resin and the polycondensation resin waste are the same type of resin.

In another aspect, a method of producing a polycondensation resin comprises adding a polycondensation resin waste to a fusion polymerization apparatus, wherein the polycondensation resin waste is supplied from a polymerization reactor in which an oligomerization reaction is being performed to a reactor maintained at a temperature and a pressure effective to produce the polycondensation resin, wherein the polycondensation resin and the polycondensation resin waste are the same type of resin.

In yet another aspect, a method of producing a polycondensation resin comprises melting a polycondensation resin waste, adding a raw material monomer, an oligomer, a catalyst, or a combination comprising one or more of the forgoing materials to the polycondensation resin waste, and adding the polycondensation resin waste to a fusion polymerisation apparatus maintained at a temperature and a pressure effective to produce the polycondensation resin, wherein the polycondensation resin and the polycondensation resin waste are the same type of resin.

DETAILED DESCRIPTION

Figure 1:
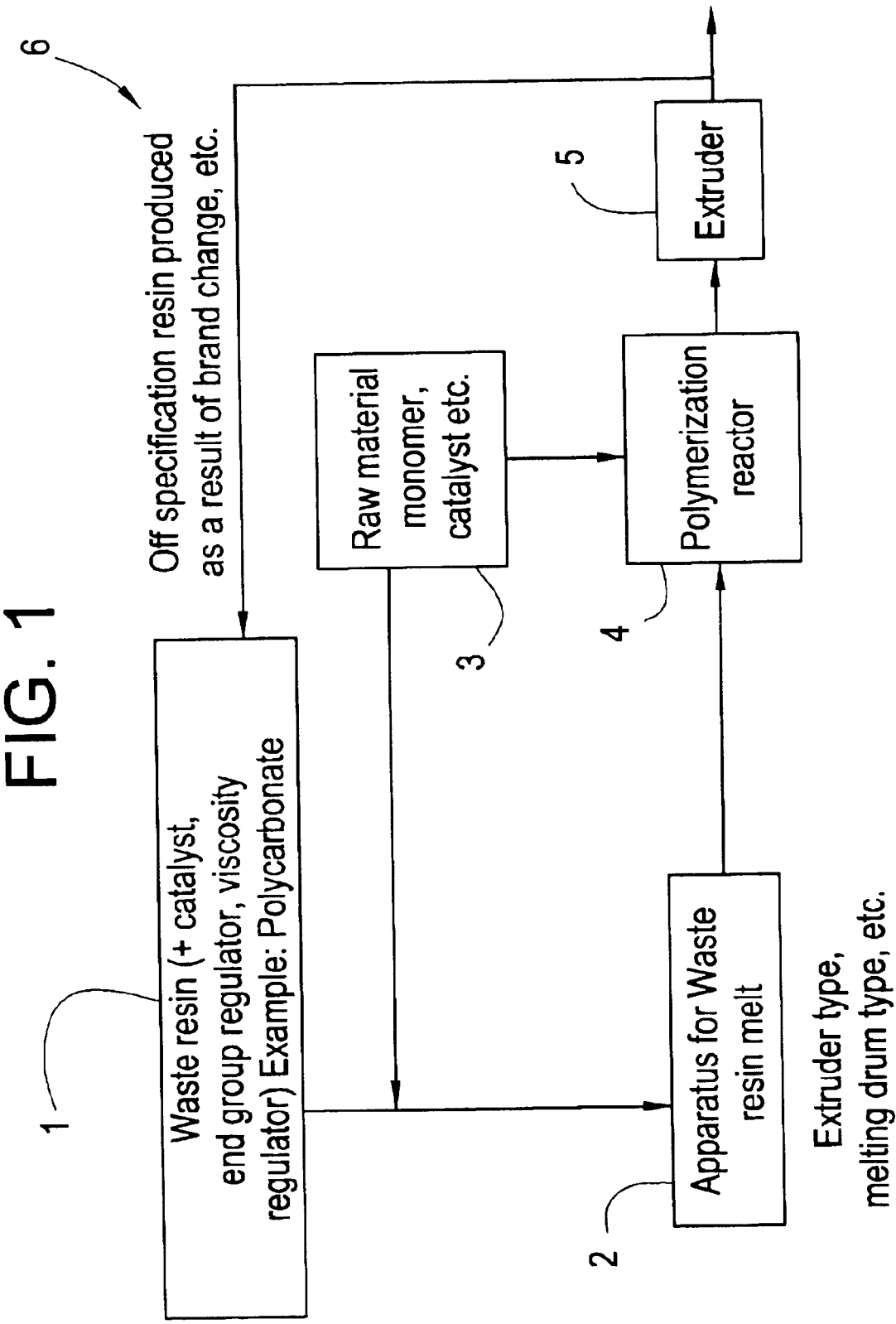
FIG. 1 is a flow diagram depicting the recycling method for polycondensation resins.

After painstaking investigations undertaken to solve the above-mentioned problems of conventional technology, the inventors hereof have found that if the polycondensation resin waste is added to a fusion polycondensation apparatus, and allowed to react, without going a depolymerization step, fused polycondensation resin on a par with the conventional product could be obtained.

In other words, the recycling method of polycondensation resin comprises adding the resin waste to a fusion polymerization apparatus to carry out the polycondensation reaction.

Furthermore, in the method of recycling polycondensation resin, the waste polycondensation resin can be supplied to any part of the polycondensation apparatus to carry out the exchange reaction and/or the polycondensation reaction between the resin being prepared in the apparatus and the resin waste supplied for the preparation of polycondensation resin. The method can be carried out in a continuous fusion polycondensation apparatus with more than one polymerization reactor connected in series.

In addition, in the method of recycling polycondensation resin, the polycondensation resin waste may be supplied from the outlet of a polymerization reactor in the first step of the polycondensation process (oligomerization process) to carry out the exchange reaction and/or the polycondensation reaction between the waste resin supplied and the resin being prepared in the second stage of the polycondensation process during the preparation of polycondensation resin. This process may be carried out in a continuous melt polycondensation apparatus with more than one polymerization reactor connected in series.

Polyester resin, polycarbonate resin and polyamide resin are examples of suitable polycondensation resins.

Polyethylene terephthalate, polyethylene naphthalate, polybutylene terephthalate, polycyclohexanedicarboxylate cyclohexanedimethanol, polyethylene isophthalate, and mixtures thereof are examples of suitable polyester resins.

Suitable polycarbonate resins, include, for example, polyester carbonates or polycarbonates prepared by the transesterification method or by the phosgene method. Polycarbonates, specifically those mainly comprising bisphenol A are suitable as the resin to be prepared by the above mentioned preparation method. Specifically, in the case of polycarbonate, formation of branched chains is controlled as much as possible, and can a polycarbonate having improved hue efficiently may be prepared. A polyamide resin can be an aliphatic polyamide or an aromatic polyamide.

The polycondensation resin wastes used in the method can have any weight-average molecular weight.

Polycondensation resin waste includes the material recovered from waste molding and nonstandard resin articles produced during the preparation of polycondensation resin (e.g., a nonstandard article produced during the change of a brandname or at the beginning of an operation).

The resin molding waste can contain additives such as, for example, fire retardants, viscosity regulators and catalysts. Furthermore, they may be those wastes in which the surface is plated or painted.

Such resin molding wastes are preferably crushed and passed through a mesh screen to remove foreign matter. The process of passing through the mesh screen may include crushing and sorting of the plastic waste or extrusion, melting and kneading during repelletization. Any of these methods may be adopted for the removal of foreign matter. The mesh size can vary depending upon the application, but generally at least 10 mesh is preferred for conformity with the JIS standard. The crushed resin molding wastes can be used as such for preparing the resin composition. In some cases, the shape of the crushed particles poses a problem in the feeder process during extrusion and affects the productivity. Thus, it is preferable to crush the particles to a size of less than 30 millimeters in the longitudinal direction.

Since, resin molding wastes generally adhere to environmental particles, such as dust, grease, etc., the surface may be cleaned by a dry process, water, organic solvent, or wet washing method which uses a interfacial active agent.

Resin molding wastes often contain metal pieces depending on the application and the recovery route. Such metal pieces may not only affect the properties of recycled material, but can also cause damage to the extruder used for the molding. Therefore, metal pieces may be eliminated using any well-known method of metal detection.

The polycondensation resin wastes are melted and added to a polycondensation reaction. The polycondensation reaction is in no way inhibited by the addition of such wastes. Moreover, surprisingly, the addition of resin wastes does not result in non-uniformity of average molecular weight, and it is also possible to control the molecular weight. The molecular weight of the polycondensation resin finally obtained can be controlled within the desirable range, even if the average molecular weight of polycondensation resin waste is higher or lower than what is desired in the final product. The mechanism is not well-understood. It is believed that the molecules of the polycondensation resin waste added during the polycondensation reaction undergo depolymerization, a transesterification reaction, or further polycondensation.

In the method of recycling polycondensation resins, the polycondensation resin waste is added to a fusion polymerization apparatus to carry out the polycondensation of the raw material monomer. To be more specific, the recycling is done according to the steps shown in the flow diagram of FIG. 1.

First, the polycondensation resin waste (1) is melted in an apparatus, such as an extruder or a melting drum (2). During the melting of the polycondensation resin waste, the raw material monomer, oligomer, and catalyst from the polycondensation reaction (3) may be included. The resin waste melted in this manner may be continuously fed to a polymerization reactor (4) and polycondensed while adding raw material monomer, oligomer, catalyst, etc. as required and pelletized by an extruder (5). From the obtained polycondensed resins, the nonstandard articles that are formed may be used again as resin waste (6).

In the recycling process, it is desirable to use very small amounts of raw material monomer or oligomer, for example, about 0 to about 10,000 parts by weight, preferably about 0 to about 200 parts by weight, to 100 parts by weight of the polycondensation resin waste. The polycondensation reaction is not adversely affected in this range.

The method of recycling polycondensation resin can be applied to a continuous fusion polycondensation apparatus where two or more polymerization reactors are connected in series. The polycondensation resin waste may be supplied to any part of the polycondensation apparatus and the polycondensation reaction or/and the transesterification reaction between the resin being prepared in the apparatus and the resin waste supplied can be carried out.

It is possible to supply the waste resin from the outlet of a polymerization reactor during the beginning of the polycondensation process (oligomerization process) to carry out the exchange reaction and/or the polycondensation reaction between the resin waste supplied and the resin being prepared in the second stage of the polycondensation process during the preparation of polycondensation resin in a continuous fusion polycondensation apparatus with more than one polymerization reactor connected in series. It is preferable to use as much of the polycondensation resin waste as possible. But about 1 to about 100 parts by weight, preferably about 5 to about 80 parts by weight per 100 parts by weight of oligomer prepared, is preferred. The polycondensation reaction is not adversely affected in this range.

The recycling method is best suited when the resin to be prepared is a polycarbonate, specifically a polycarbonate comprising bisphenol A.

Hereinafter, the recycle method is explained with the use of polycarbonate as an example.

Dihydroxy compounds, carbonate diesters and polycarbonate resin wastes are used as raw materials for recycling polycarbonate resin. The dihydroxy compound to be used is not critical. Bisphenol, represented by the following general formula 1, can be used.

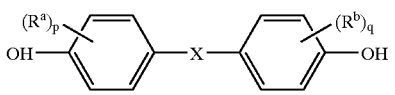

(1)

wherein $R^a$ and $R^b$ are halogen atoms or monovalent hydrocarbon groups; $R^a$ and $R^b$ can be the same or different; p and q are integers 0–4;
and wherein X is

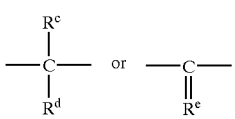

wherein $R^c$ and $R^d$ are hydrogen atoms or monovalent hydrocarbon groups and they can form a cyclic structure, and $R^e$ is a divalent hydrocarbon group.

Examples of bisphenol represented by general formula 1 are bis(hydroxyaryl) alkanes, such as 1,1-bis(4-hydroxyphenyl)methane, 1,1-bis(4-hydroxyphenyl)ethane, 2,2-bis (4-hydroxyphenyl)propane (hereinafter, referred as bisphenol A), 2,2-bis(4-hydroxyphenyl)butane, 2,2-bis(4-hydroxyphenyl)octane, 1,1-bis(4-hydroxyphenyl)propane, 1,1-bis(4-hydroxyphenyl)n-butane, bis(4-hydroxyphenyl) phenylmethane, 2,2-bis(4-hydroxy-1-methylphenyl) propane, 1,1-bis(4-hydroxy-t-butylphenyl)propane and 2,2-bis(4-hydroxy-3-bromophenyl)propane; and bis (hydroxyaryl)cycloalkanes, such as 1,1,-bis(4-hydroxyphenyl)cyclopentane and 1,1,-bis(4-hydroxyphenyl)cyclohexane, and mixtures comprising one or more of the foregoing compounds.

In addition, bisphenols where X is —O—, —S—, —SO— or —$SO_2$— can also be used in the method.

The compound represented by the general formula 2 are the examples of bisphenol series.

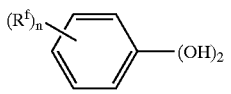

(2)

wherein, $R^f$ is a halogen atom, or a hydrocarbon group or a halogen-substituted hydrocarbon group having 1–10 carbon atoms, n is any integer from 0 to 4. When n is at least 2, each $R^f$ may be same or different).

2,2,2',2'-tetrahydro-3,3,3',3'-tetramethyl-1,1'-spirobi-[1H-indene]-6,6'-diol, represented by the general formula given below, can also be used as the bisphenol.

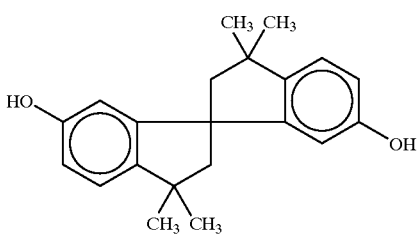

(3)

Among all of the bisphenols, the bisphenols represented by the general formula 1 are preferred, preferably bisphenol A.

In the method, at least two or three dihydroxy compounds can be combined to prepare polycarbonate copolymer.

Examples of carbonate diesters that may be used in the method are diphenyl carbonate, bis(2,4-dichlorophenyl) carbonate, bis(2,4,6-trichlorophenyl)carbonate, bis(2-cyanophenyl)carbonate, bis(o-nitrophenyl)carbonate, ditolyl carbonate, m-cresyl carbonate, dinaphthyl carbonate, bis (diphenyl)carbonate, diethyl carbonate, dimethyl carbonate, dibutyl carbonate and dicyclohexyl carbonate. Among these, diphenyl carbonate is preferred. In addition, two or more of these carbonate diesters may be used in combination.

The carbonate diester used in the method can contain a dicarboxylic acid or a dicarboxylic acid ester. To be more specific, the carbonate diester can contain dicarboxylic acid and/or dicarboxylic acid ester in an amount of less than about 50 mole %, preferably not less than about 30 mole %.

The Examples of such dicarboxylic acid and dicarboxylic acid ester are terephthalic acid, isophthalic acid, sebacic acid, decanedioic acid, dodecanedioic acid, diphenyl sebacate, diphenyl terephthalate, diphenyl isophthalate and diphenyl decanedioic acid. The carbonate diester can contain two or more kinds of dicarboxylic acid or dicarboxylate ester.

The above-described carbonate diester containing a dicarboxylic acid or a dicarboxylate ester and the above-described aromatic dihydroxy compound are polycondensed to form a polyester polycarbonate.

Generally, an alkali metal and/or an alkali earth metal compound is used as the catalyst for fusion polycondensation.

Among the alkali metal and alkaline earth metal compounds, organic acid salts, inorganic acid salts, oxides, hydroxides, hydrides, and alcoholates are preferred. Examples include sodium hydroxide, potassium hydroxide, lithium hydroxide, sodium hydrogen carbonate, potassium hydrogen carbonate, lithium hydrogen carbonate, sodium carbonate, potassium carbonate, lithium carbonate, sodium acetate, potassium acetate, lithium acetate, sodium stearate, potassium stearate, lithium stearate, sodium borohydride, lithium borohydride, phenyl sodium borohydride, sodium benzoate, potassium benzoate, lithium benzoate, disodium hydrogen phosphate, dipotassium hydrogen phosphate, dilithium hydrogen phosphate, dilithium hydrogen phosphite ($Li_2HPO_3$), sodium dihydrogen phosphite ($NaH_2PO_3$), potassium dihydrogen phosphite ($KH_2PO_3$), rubidium dihydrogen phosphite ($RbH_2PO_3$), easium dihydrogen phosphite ($CsH_2PO_3$), dilithium hydrogen phosphite ($Li_2HPO_3$), disodium hydrogen phosphite ($Na_2HPO_3$), dipotassium hydrogen phosphite ($K_2HPO_3$), dirubidium hydrogen phosphite ($Rb_2HPO_3$), dicesium hydrogen phosphite ($Cs_2HPO_3$), trilithium phosphite ($Li_3PO_3$), trisodium phosphite ($Na_3PO_3$), tripotassium phosphite ($K_3PO_3$), trirubidium phosphite ($Rb_3PO_3$), trieasium phosphite ($Cs_3PO_3$), disodium, dipotassium and dilithium salts of bisphenol A, and sodium, potassium and lithium salts of phenols. Examples of alkali earth metal compounds are calcium hydroxide, barium hydroxide, magnesium hydroxide, strontium hydroxide, calcium hydrogen carbonate, barium hydrogen carbonate, magnesium hydrogen carbonate, strontium hydrogen carbonate, calcium carbonate, barium carbonate, magnesium carbonate, strontium carbonate, calcium acetate, barium acetate, magnesium acetate, strontium acetate, calcium stearate, barium stearate, magnesium stearate and strontium stearate. These compounds may be used in combinations of at least two.

The amount of alkali metal and/or alkaline earth metal compound is about $1 \times 10^{-8}$ to about $1 \times 10^{-3}$ mole, preferably about $1 \times 10^{-7}$ to about $2 \times 10^{-6}$ mole, and more preferably about $1 \times 10^{-7}$ to about $8 \times 10^{-7}$ mole per mole of bisphenol during the fusion polycondensation reaction. If bisphenol, which is the raw material of the fusion polycondensation reaction, already contains an alkali metal and/or alkaline earth metal compound, the amount of the alkali metal and/or alkaline earth metal compound to be added is preferably controlled in such a manner that its total amount is within the range specified above, with respect to the amount of the bisphenol, during the polycondensation.

In addition to the above-specified alkali metal and/or alkaline earth metal compound, a basic compound may also be used as the catalyst for the fusion polycondensation. Examples of the basic compound are nitrogen containing and phosphorus containing bases that are easily decomposed or are volatile at high temperatures.

The examples of such basic compounds are ammonium hydroxide containing alkyl, aryl or araryl groups, such as tetramethyl ammonium hydroxide ($Me_4NOH$), tetraethyl ammonium hydroxide ($Et_4NOH$), tetrabutyl ammonium hydroxide ($Bu_4NOH$) and trimethylbenzyl ammonium hydroxide ($\phi$-$CH_2(Me)_3NOH$); phosphonium hydroxide containing alkyl, aryl or araryl groups, such as tetramethyl phosphonium hydroxide ($Me_4POH$), tetraethyl phosphonium hydroxide ($Et_4POH$), tetrabutyl phosphonium hydroxide ($Bu_4POH$), and trimethylbenzyl phosphonium hydroxide ($\phi$-$CH_2(Me)_3POH$); tertiary amines like trimethylamine, triethylamine, dimethylbenzylamine, triphenylamine, etc.; secondary amines $R_2NH$ (wherein, R is alkyl group like methyl or ethyl, or aryl like phenyl or tolyl); primary amines $RNH_2$ (wherein, R is same as above); pyridines like 4-dimethylaminopyridine, 4-diethylaminopyridine, 4-pyrolidinopyridine; imidazole, such as 2-methylimidazole and 2-phenylimidazole; ammonia; and basic salts like tetramethylammonium borohydride ($Me_4NBH_4$), tetrabutylammonium borohydride ($Bu_4NBH_4$), tetramethylammonium tetraphenylborate ($Me_4NBPh_4$), tetrabutylammonium tetraphenylborate ($Bu_4NBPh_4$), tetramethylammonium acetate, tetrabutylammonium acetate, tetramethylammonium phosphate, tetrabutylammonium phosphate, tetramethylammonium phosphite, tetrabutylammonium phosphite, tetramethyl phosphonium borohydride ($Me_4PBH_4$), tetrabutyl phosphonium borohydride ($Bu_4PBH_4$), tetramethyl phosphonium tetraphenylborate ($Me_4PBPh_4$), tetrabutyl phosphonium tetraphenylborate ($Bu_4NBPh_4$), tetramethylphosphonium acetate, tetrabutyl phosphonium acetate, tetramethylphosphonium phosphate, tetrabutyl phosphonium phosphate, tetramethyl phosphonium phosphite, and tetrabutyl phosphonium phosphite.

Amongst all of the basic compounds, tetra alkyl ammonium hydroxides and their salts, tetra alkyl phosphonium hydroxides and their salts are preferred. The nitrogen-containing basic compound may be added in an amount of about $1\times10^{-6}$ to about $1\times10^{-1}$ mole, preferably about $1\times10^{-5}$ to about $1\times10^{-2}$ mole per mole of bisphenol.

In addition, a boric acid compound may also be used as a catalyst. Such boric acid compounds are boric acids and boric acid esters, and examples of boric acid esters can be represented by the general formula 4 given below.

$$B(OR)_n(OH)_{3-n} \qquad (4)$$

wherein, R is alkyl such as methyl or ethyl or aryl such as phenyl, n is 1, 2, or 3.

Examples of such boric acid esters are trimethyl borate, triethyl borate, tributyl borate, trihexyl borate, triheptyl borate, triphenyl borate, tritolyl borate and trinaphthyl borate.

The boric acid or boric acid ester may be added to the extent of about $1\times10^{-8}$ to about $1\times10^{-1}$ moles, preferably about $1\times10^{-7}$ to about $1\times10^{-2}$ moles, and most preferably about $1\times10^{-6}$ to about $1\times10^{-4}$ moles per mole of bisphenol added.

A combination of an alkali metal and/or alkaline earth metal compound and a nitrogen-containing basic compound, or a combination of an alkali metal and/or alkaline earth metal compound, a nitrogen-containing basic compound and boric acid or a boric acid ester, is preferred as a catalyst for the fusion polycondensation reaction.

The use of a combination of an alkali metal and/or alkaline earth metal compound and the nitrogen-containing or phosphorus-containing basic compound, added in the amount specified earlier, is preferable because it advances the polycondensation at a satisfactory rate and facilitates the formation of high molecular weight polycarbonate with a high polymerization activity.

When using a combination of an alkali metal and/or alkaline earth metal compound and a nitrogen-containing basic compound, or a combination of an alkali metal and/or alkaline earth metal compound, a nitrogen-containing basic compound and boric acid or a boric acid ester, the catalyst components may be added to the fused mixture of the bisphenol and the carbonate diester separately or after pre-mixing the catalyst components.

While preparing a polycarbonate, a terminal sealant may be used along with the aromatic dihydroxy compound and carbonate diester described earlier.

Aryloxy compounds that can introduce terminal groups at the ends of polycarbonates prepared can be represented by the following general formula $$ArO— \qquad (5)$$

wherein Ar is an aromatic hydrocarbon group with about 6–50 carbon atoms. The aromatic hydrocarbon group is not critical, and it can, for instance, be a phenyl group, a naphthyl group, or a condensed ring of an anthranile group. Moreover, such aromatic rings can form rings with saturated hydrocarbons and/or heteroatoms. The aromatic ring can have substituted halogens or alkyl groups with 1–9 carbon atoms.

Examples of the above-described aryloxy compounds are phenol, diphenyl carbonate, p-tert-butylphenol, p-tert-butylphenyl phenylcarbonate, p-tert-butyl phenyl carbonate, p-cumylphenol, p-cumylphenyl phenyl carbonate, p-cumylphenyl carbonate, and chromane compounds like 2,2,4-trimethyl-4-(4-hydroxyphenyl)chromane, 2,2,4,6-tetramethyl-4-(3,5-dimethyl-4-hydroxyphenyl)chromane, 2,2,3-trimethyl-3-(4-hydroxyphenyl)chromane, 2,2,3,6-tetramethyl-3-(3,5-dimethyl-4-hydroxyphenyl)chromane, 2,4,4-trimethyl-2-(2-hydroxyphenyl)chromane, 2,4,4,6-tetramethyl-2-(3,5-dimethyl-2-hydroxyphenyl)chromane, and mixtures thereof Generally, a suitable amount of the aryloxy compound is about 0.01 to about 0.2 moles, preferably about 0.02 to about 0.15 moles, and most preferably about 0.02 to about 0.1 moles per mole of aromatic dihydroxy compound.

By using the above-specified amount of aryloxy compound as the terminal sealant, the obtained polycarbonate molecule termini are represented by the above-mentioned general formula 5. The fraction of sealed ends comprising formula 5 is about 1 to about 95%, preferably about 10 to about 95%, and most preferably about 20 to about 90%.

If desired, aliphatic monocarboxy compounds that can introduce aliphatic hydrocarbon units represented by the general formula 6, may be used as the terminal sealant along with aryloxy compound.

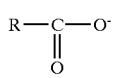

(6)

wherein, R is an alkyl group with 10–30 carbon atoms, which may be straight or branched chain and may be halogen substituted.

Examples of aliphatic monocarboxy compounds are alkyl monocarboxylic acids, such as undecanoic acid, lauric acid, tridecanoic acid, pentadecanoic acid, palmitic acid, heptadecanoic acid, stearic acid, nonadecanoic acid, heneicosanoic acid, tricosanoic acid, mellissic acid, and alkyl monocarboxylic acid esters like methyl, ethyl and phenyl esters of the above-listed alkyl monocarboxylic acids, such as methyl stearate, ethyl stearate and phenyl stearate.

The polycarbonate resin waste used in the method can be prepared by the well-known phosgene method or by the fusion polycondensation method descried above (see, for example, Japanese Kokai Publication no. 63-215763 and Japanese Kokai Publication no. 2-124934). The polycarbonate resin waste can contain various additives like terminal sealant stabilizers and the like and catalysts may be used for polycondensation.

The polycondensation of the dihydroxy compound and the carbonate diester can be carried out under the reaction conditions conventionally used for polycondensation.

Specifically, in the first stage of the reaction, bisphenol and carbonate diester are allowed to react at 80 to 250° C., preferably at, and most 100 to 230° C., and most preferably at 120 to 190° C., for 0 to 5 hours, preferably 0 to 4 hours preferably 0 to 3 hours, under normal pressure. After the first stage, the temperature is raised while bringing the reaction system under reduced pressure. Finally, the temperature is brought to 240 to 320° C. and polycondensation is carried out between bisphenol and carbonate diester in this temperature range under a pressure of 5 millimeters of mercury (mm Hg) or less, preferably lower than 1 mm Hg.

The above-mentioned polycondensation reaction may be carried out continuously or batchwise. In addition, the reactor used for the reaction may be of a tank type, tubular or lower type.

Any conventional reactor may be used for continuous production of the polycarbonate. It is preferable to use a reactor in which the mode of stirring is variable, such that one mode may be used when the reaction mixture has a relatively low viscosity (e.g., at early stage of polymerization), and another mode may be used at the later stage of polymerization when viscosity is high.

Examples of such reactors are vertical agitator polymerization reactors, thin film evaporators, vacuum polymerization reactors, horizontal agitator polymerization reactors, biaxial vented extruders, and the like. It is preferable to use at least two reactors connected in series, specifically using a horizontal reactor (such as horizontal agitator polymerization reactor) as at least one of the reactors. The possible combinations of such reactors include a vertical agitator reactor and a horizontal agitator reactor, a horizontal agitator reactor and a vertical agitator reactor, a first horizontal agitator reactor with a second horizontal agitator reactor, a vertical agitator with a vacuum reactor and a horizontal polymerization reactor, and a thin film evaporator with a first and a second horizontal agitator reactor.

When combining at least two reactors, it is preferable to use three or more reactors arranged in series, with at least one of them preferably being a horizontal reactor, such as a horizontal agitator polymerization reactor. Some combinations of reactors, when using at least three reactors in series are at least two vertical agitator reactors with one horizontal agitator reactor, one or more vertical agitator reactors with one thin film evaporator and one horizontal agitator reactor, and one or more vertical agitator reactors and at least two horizontal agitator reactors. The use of a combination of at least two reactor units connected in series improves the efficiency of the polycondensation reaction.

The polycarbonate resin waste may be added to the raw material of the polycondensation reaction (monomer and catalyst) from the beginning or at a later stage of reaction where the polycondensation has advanced to some extent.

Figure 2:
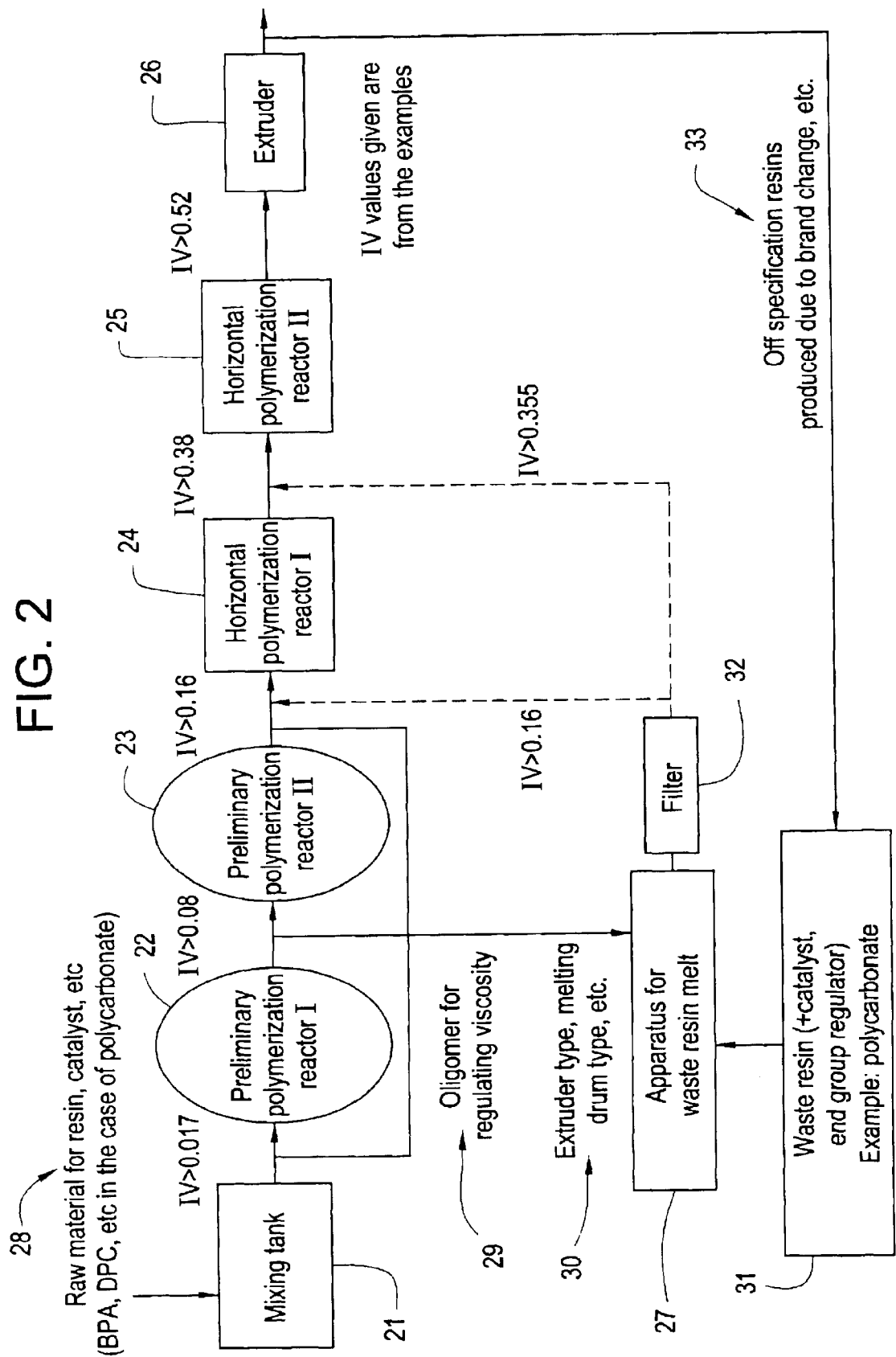
FIG. 2 is a flow diagram of the recycling method, wherein the polycondensation resin is a polycarbonate resin.

It is preferable to add the resin waste either after the first polycondensation step (e.g., after formation of oligomer) or just before the final polycondensation step (FIG. 2). FIG. 2 shows a polymerization apparatus equipped with a mixing tank (21), a preliminary polymerization tank I (22), a preliminary polymerization tank II (23), a horizontal polymerization reactor I (24), a horizontal polymerization reactor II (25), an extruder (26) and a polymerization apparatus for fused resin waste (27). The raw materials for the polycondensation (bisphenol A, diphenyl carbonate, etc) and the catalyst (28) are supplied to the mixing tank where the materials are stirred at a certain speed. The mixed material is supplied in order to preliminary polymerization tanks I and II (22,23). The oligomers (29) with a low degree of polymerization obtained after polycondensation in these reactors may be isolated using an extruder or melting drum (30) and then supplied to the horizontal polymerization reactors I and II (24,25). The resin waste (waste polycarbonate) (31) melted in the resin waste apparatus is continuously supplied to the horizontal polymerization reactors I and/or II (24,25), where the polycondensation is continued until the reaction mixture assumes a certain intrinsic viscosity. The resin waste may be passed through a filter (32). From the obtained polycondensed resins, the nonstandard articles that are formed may be used again as resin waste (33).

After the polycondensation reaction is complete, the resin (polycarbonate) is pelletized in an extruder (26), where it may be mixed with various additives, if necessary.

The resin waste (polycarbonate resin waste) may be added once during the polycondensation step, or it may be added in several instalments.

When adding the resin waste, additional supplies of raw material monomer, catalyst and oligomer may also be added.

The polycarbonate obtained preferably has an intrinsic viscosity of about 0.10 to about 1.0 deciliters per gram (dl/g), preferably about 0.30 to about 0.65 dl/g when measured in methylene chloride at 20° C.

When the above-mentioned recycling method is used, polycarbonate with improved color can be prepared efficiently, suppressing to the maximum extent of the formation of the branched compounds (I) and (II) of the general formulas given below.

(7)

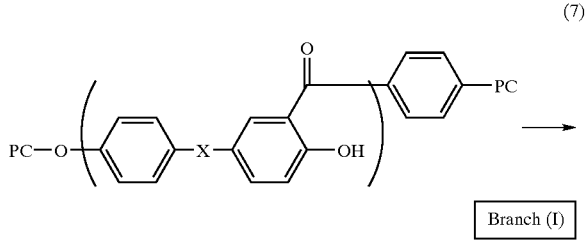

-continued

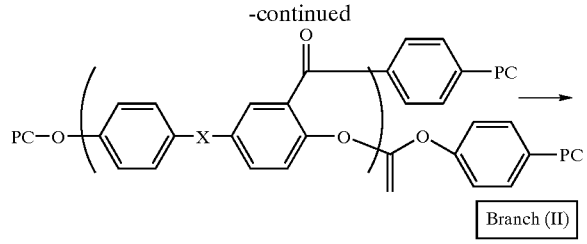

(X stands for a straight chain or branched hydrocarbon group)

When a polycarbonate is prepared by the recycling method, the formation of the above-mentioned branched compounds (I) and (II) can be minimized. It is believed that the resin waste has a suitably high molecular weight and therefore requires less heat energy and less retention time at high temperature compared to polymerization of monomers.

In the method, sulphur-containing acidic compounds and/or derivatives of such compounds with pKa of 3 or less, as specified below, (hereinafter referred as "acidic compounds") can be added immediately after the polycondensation, without cooling the product polycarbonate.

The sulfur containing acidic compounds and their derivatives can be sulfurous acid, sulphuric acid, sulfinic acid compounds, sulfonic acid compounds, and their derivatives. Examples are ethyl benzene sulfonate, butyl benzene sulfonate, methyl p-toluene sulfonate, ethyl p-toluene sulfonate and butyl p-toluene sulfonate.

These acidic compounds may be used to the extent of about 0.1 to about 50 moles, preferably about 0.1 to about 15 moles, and more preferably about 0.1 to about 7 moles per mole of the total alkali metal and/or alkaline earth metal component used as the catalyst for the above mentioned polycarbonate reaction. Adding these acidic compounds to the reaction product (polycarbonate) neutralizes or deactivates the residual phosphite of the alkali metal and/or alkaline earth metal compound, improving the retention stability and water resistance of the obtained polycarbonate.

The polycarbonate may be molded by an ordinary kneader, such as a monoaxial extruder, a biaxial extruder and static mixer. A kneader with or without vents can both be used effectively.

The polycarbonate product can contain additives to the extent that they do not adversely affect the properties of the resin produced.

The additives used are generally added to the polycarbonate depending on the application. Examples are heat resistance stabilizers, epoxy compounds, UV absorbents, mold lubricants, pigments, antistatic agents, slipping agents, antiblocking agents, lubricants, anticlouding agents, natural oils, synthetic oils, wax, organic and inorganic fillers, and the like, and combinations of the foregoing additives.

Polycarbonates produced in this manner are pelletized, if needed, before they are used in various applications. The obtained polycarbonate has superior color and is suitable for optical materials.

In the above described process, polycondensation resin waste can be recycled without subjecting the resin waste to cumbersome operations like depolymerization and extraction of oligomer components. The polycondensation resin has the same characteristics as virgin resin containing no recycled elements. In addition, when the polycondensation resin is a polycarbonate, the formation of branches is minimised and polycarbonate with far improved colour compared to conventional polycarbonate can be prepared efficiently.

EXAMPLES

The method is further illustrated by the following non-limiting examples.

The physical properties of the examples and comparative examples were measured by the methods listed below.

Intrinsic viscosity (IV) of polycarbonate: =measured in methylene chloride at a concentration of 0.5 dl/g at 20° C. using a Ubbelohde viscometer.

Color of polycarbonate: the polycarbonate pellets were dissolved to make a 20% solution in methylene chloride and the b* value was determined by measuring transmittance with Macbeth C-7000A at 10° visual field and a D65 light source.

Terminal OH group concentration of polycarbonate: 0.4 grams of a polycarbonate sample was dissolved in 3 milliliters of chloroform and the ratio (%) of OH groups in the total terminal groups was determined by 13 C-NMR.

Branching in the polycarbonate: In order to determine the extent of branched compounds (I) and (II) in the polycarbonate, the sample was first hydrolyzed with alkali and subjected to HPLC to determine the amount of the following two types of compounds.

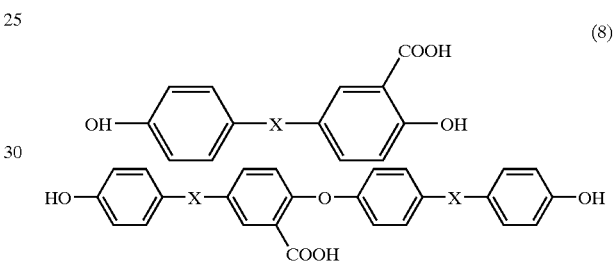

wherein X is a straight chain or branched hydrocarbon group)

Polycondensation conditions of polycarbonate: A continuous fusion polymerization apparatus as shown in FIG. 2 was used for polycondensation of the polycarbonate. The apparatus was equipped with one mixing tank, two preliminary polymerization reactors, and two horizontal polymerization reactors for mixing the raw materials. The reaction conditions are given in Table 1.

TABLE 1

|  | Pressure | Temperature (° C.) | Average retention time (hr) | Outlet IV (dl/g) |
|---|---|---|---|---|
| Mixing tank | N₂ atmosphere | 160 | 2.0 | 0.017 |
| Preliminary polymerization reactor I | 100 torr | 230 | 1.0 | 0.06 |
| Preliminary polymerization reactor II | 20 torr | 270 | 0.5 | 0.155 |
| Horizontal polymerization reactor I | 2 torr | 310 | 0.5 | 0.382 |
| Horizontal polymerization reactor II | 0.8 torr | 310 | 0.5 | 0.524 |

Molten bisphenol A (BPA) supplied directly (supply rate of 360 parts by weight/hour) through a pipe from a bisphenol A manufacturing apparatus, molten diphenyl carbonate supplied directly (supply rate of 347 parts by weight/hour) through a pipe after distillation, $2.5 \times 10^{-4}$ moles of tetramethyl ammonium hydroxide per mole of BPA, and $1\times10^{-6}$ moles of sodium hydroxide per mole of BPA (both catalysts), were continuously supplied to the mixing tank, maintained at the temperature given in Table 1. The material in the mixing tank was then supplied from the mixing tank at the rate of 360 parts by weight/hour (in terms of BPA) to the preliminary polymerization reactors I and II, and the horizontal polymerization reactors I and II, in that order, to carry out polymerization under the reaction conditions given in Table 1. The intrinsic viscosity (IV) at the outlet of the mixing tank and the different polymerization reactors are given in Table 1.

Comparative Example 1

100 parts by weight of oligomer taken from the outlet of the preliminary polymerization reactor II in the above-described polymerization system, having an IV of 0.155 dl/g, a terminal OH group content 32%, 350 ppm of branched compound (1) and less than 10 ppm of branched compound, was placed in a flask equipped with a stirrer. The air in the flask was removed to create a vacuum and replaced with nitrogen. This procedure was repeated twice. The contents were then melted in a nitrogen atmosphere at 310° C. The molten material was then supplied to the horizontal reactor I and polymerized while stirring for 30 minutes at a pressure of 2 torr while evaporating the phenol.

The results are given in Table 2.

Comparative Example 2

After polymerization under reaction conditions similar to those of the horizontal reactor I in Comparative example I, the material was supplied to the horizontal reactor II where it was polymerized at 310° C. after stirring for 30 minutes at 0.8 torr, while evaporating the phenol.

The results are given in Table 2.

Example 1

50 parts by weight of oligomer taken from the outlet of the preliminary polymerization reactor II in the above-described polymerization system and 50 parts by weight of polycarbonate waste (waste spools created during the molding of a commercially available compact disc), having an IV of 0.353 dl/g, a terminal OH group content of 19%, 750 ppm of branched compound (1), less than 10 ppm of branched compound (2) and phenol as the terminal sealant, were placed in a flask equipped with a stirrer. The air in the flask was removed to create a vacuum and replaced with nitrogen three times. The contents were then melted in the nitrogen atmosphere at 310° C., supplied to the horizontal polymerization reactor I, and polymerized under stirring for 30 minutes at a pressure of 2 torr while evaporating off the phenol. Atomic absorption analysis of the polycarbonate waste revealed that it contained about 5 ppm of elemental phosphorus believed to have originated from the stabilizer.

The results are given in Table 2.

Example 2

Polymerization was carried out as in Example 1, except for adding sodium hydroxide beforehand as catalyst in an amount of $10^{-6}$ moles per mole of BPA in the mixture of oligomer and polycarbonate waste.

The results are given in Table 2.

Example 3

Polymerization was carried out first under conditions similar to those of the horizontal polymerization reactor I in Example 2. The reaction mixture was then supplied to the horizontal polymerization reactor II and polymerized by stirring for 30 minutes at 310° C. at a pressure of 0.8 torr, while evaporating off the phenol.

The results are given in Table 2.

Example 4

50 parts by weight of oligomer taken from the outlet of the preliminary polymerization reactor II in the above-described polymerization apparatus and 50 parts by weight of polycarbonate waste (waste spools created during the molding of a commercially available compact disc) having an IV of 0.353 dl/g, a terminal OH group content of 5%, less than 10 ppm of branched compound (1), less than 10 ppm of branched compound (2) and t-butyl phenol as the terminal sealant, were placed in a flask equipped with a stirrer. The air in the flask was removed to create a vacuum and replaced with nitrogen three times. The contents were then melted in the nitrogen atmosphere at 310° C., and supplied to the horizontal reactor I, where they were polymerized by stirring for 30 minutes at a pressure of 2 torr while evaporating off the phenol.

The results are given in Table 2.

Atomic absorption analysis of this polycarbonate waste revealed that it also contained about 5 ppm of elemental phosphorus believed to have originated from the stabiliser.

Example 5

Polymerization was carried out as in Example 4 except for adding sodium hydroxide beforehand as a catalyst to the extent of $10^{-6}$ moles per mole of BPA in the mixture of oligomer and polycarbonate waste.

The results are given in Table 2.

Example 6

After polymerization in the horizontal polymerization reactor I as in Example 5, the reaction mixture was supplied to the horizontal reactor II where it was polymerized at 310° C. by stirring, for 30 minutes at 0.8 torr, while evaporating off the phenol.

The results are given in Table 2.

Example 7

Unlike in Example 2, no oligomer taken from the outlet of the preliminary polymerization reactor II was used. 100 parts by weight of polycarbonate waste (waste spools created during the molding of a commercially available compact disc), having an IV of 0.353 dl/g, a terminal OH group content of 19%, 750 ppm of branched compound (1), less than 10 ppm of branched compound (2) and phenol as the terminal sealant was placed in a flask equipped with a stirrer. The air in the flask was removed to create a vacuum and replaced with nitrogen three times. The contents were melted at 310° C. in nitrogen atmosphere and then supplied to the horizontal polymerization reactor I, where they were polymerized while stirring for 30 minutes at a pressure of 2 torr, while evaporating the phenol.

The results are given in Table 2.

Example 8

50 parts by weight of oligomer taken from the outlet of the preliminary polymerization reactor II in the above-described polymerization system and 50 parts by weight of polycarbonate waste (waste spools created during the molding of a commercially available compact disc), having an IV of 0.353 dl/g, a terminal OH group content of 5%, less than 10 ppm of branched compound (1), less than 10 ppm of branched compound (2) and t-butyl phenol as the terminal sealant were placed in a flask equipped with a stirrer as in Embodiment 4, but along with an additional 1.05 parts by weight of BPA to adjust the proportion of the terminal OH groups. The air in the flask was removed to create a vacuum and replaced with nitrogen three times. The contents were melted in nitrogen atmosphere at. 310° C. and then supplied to the horizontal polymerization reactor I where they were polymerized while stirring for 30 minutes at a pressure of 2 torr while evaporating the phenol.

The results are given in Table 2.

Experiment 9

After polymerization in the horizontal polymerization reactor I as in experiment 8, the reaction mixture 1 was polymerized under conditions similar to those of the horizontal polymerization reactor II at 310° C. while stirring, for 30 minutes at 0.8 torr pressure, while evaporating the phenol.

The results are given in Table 2.

Experiment 10

Unlike in experiment 5, no oligomer taken from the outlet of the preliminary polymerization reactor II was used. 100 parts by weight of polycarbonate waste (waste spools created during the molding of a commercially available compact disc), having an IV of 0.353 dl/g, a terminal OH group content of 5%, less than 10 ppm of branched compound (1), less than 10 ppm of branched compound (2) and t-butyl phenol as the terminal sealant was placed in a flask equipped with a stirrer. The air in the flask was removed to create a vacuum and replaced with nitrogen three times. The contents were melted at 310° C. in the nitrogen atmosphere and then supplied to the horizontal polymerization reactor I where they were polymerized while stirring for 30 minutes at a pressure of 2 torr, while evaporating off the phenol.

The results are given in Table 2.

| | Amount of Oligomer from the preliminary polymerization reactor II Parts by Weight | Waste Polycarbonate | | | Polymerization conditions | | | Characteristics of the polymerization product | | | | color Color of solution b* |
|---|---|---|---|---|---|---|---|---|---|---|---|---|
| | | Terminal Sealant By weight | Terminal OH group content Parts | Amount Added to Reaction Parts by Weight | Catalyst | Amt. of catalyst in the entire system × 10⁻⁶ | Time under 310° C., 2 torr minutes | Time under 310° C., 0.8 torr minutes | IV (dl/g) | Terminal OH group content (%) | Branched product (1) (ppm) | Branched product (2) (ppm) | |
| Comparative Example 1 | 100 | No amount added | | | NaOH | 1.0 | 30 | — | 0.48 | 13 | 1220 | 40 | 0.31 |
| Comparative Example 2 | 100 | No amount added | | | NaOH | 1.0 | 30 | 30 | 0.53 | 11 | 1650 | 70 | 0.62 |
| Example 1 | 50 | Phenol | 19 | 50 | NaOH | 0.5 | 30 | — | 0.37 | 16 | 630 | <10 | 0.23 |
| Example 2 | 50 | Phenol | 19 | 50 | NaOH | 1.0 | 30 | — | 0.42 | 16 | 710 | <10 | 0.23 |
| Example 3 | 50 | Phenol | 19 | 50 | NaOH | 1.0 | 30 | 30 | 0.54 | 12 | 1130 | 30 | 0.44 |
| Example 4 | 50 | t-butylphenol | 5 | 50 | NaOH | 0.5 | 30 | — | 0.35 | 12 | 270 | <10 | 0.29 |
| Example 5 | 50 | t-butylphenol | 5 | 50 | NaOH | 1.0 | 30 | — | 0.38 | 10 | 310 | <10 | 0.44 |
| Example 6 | 50 | t-butylphenol | 5 | 50 | NaOH | 1.0 | 30 | 30 | 0.47 | 6 | 620 | <10 | 0.50 |
| Example 7 | — | Phenol | 19 | 100 | NaOH | 1.0 | 30 | — | 0.42 | 15 | 780 | <10 | 0.22 |
| Example 8 | 50 | t-butylphenol | 5 | 50 | NaOH | 0.75 | 30 | — | 0.40 | 24 | 420 | <10 | 0.39 |
| Example 9 | 50 | t-butylphenol | 5 | 50 | NaOH | 0.75 | 30 | 30 | 0.51 | 23 | 950 | 20 | 0.60 |
| Example 10 | — | t-butylphenol | 5 | 100 | NaOH | 0.75 | 30 | — | 0.38 | 4 | 20 | <10 | 0.44 |

Conditions of measuring solution color: 20% solution in methylene chloride

Apparatus used: Macbeth C-7000A

Transmittance measurements (L*, a*, b*), 10° Visual field, D65 light source

While the invention has been described with reference to a preferred embodiment, it will be understood by those skilled in the art that various changes may be made and equivalents may be substituted for elements thereof without departing from the scope of the invention. In addition, many modifications may be made to adapt a particular situation or material to the teachings of the invention without departing from essential scope thereof. Therefore, it is intended that the invention not be limited to the particular embodiment disclosed as the best mode contemplated for carrying out this invention, but that the invention will include all embodiments falling within the scope of the appended claims.

What is claimed is:

1. A method of producing a polycondensation resin, comprising
    melting a polcondenasation resin waste;
    adding a melted polycondensation resin waste to a fusion polymerisation apparatus maintained at a temperature and a pressure effective to produce the polycondensation resin, wherein the polycondensation resin and the polycondensation resin waste are the same type of resin.

2. The method of claim 1, further comprising adding a raw material monomer, an oligomer, a catalyst, or a combination of one or more of the foregoing materials to the melted polycondensation resin waste prior to adding to the fusion polymerization apparatus.

3. The method of claim 1, wherein the polycondensation resin waste is supplied from a reactor of the fusion polymerisation apparatus in which an oligomerization reaction is being performed.

4. The method of claim 1, wherein the polycondensation resin waste is supplied to a polymerization reactor of the fusion polyinerisation apparatus in which a polycondensation reaction is being performed.

5. The method of claim 1, wherein the fusion polymerization apparatus comprises a polymerization reactor selected from the group consisting of a vertical agitator polymerization reactor, a thin film evaporator, a vacuum polymerization reactor, a horizontal agitator polymerization reactor, and a biaxial vented extruder.

6. The method of claim 1, wherein the fusion polymerization apparatus comprises more than one polymerization reactor connected in series.

7. The method of claim 6, wherein the fusion polymerization apparatus comprises a combination of fusion polymerization reactors selected from the group consisting of a vertical agitator reactor and a horizontal agitator reactor, a horizontal agitator reactor and a vertical agitator reactor, a first horizontal agitator reactor and a second horizontal agitator reactor, a vertical agitator reactor with a vacuum reactor and a horizontal polymerization reactor, and a thin film evaporator with a first and a second horizontal agitator reactor.

8. The method of claim 6, wherein the fusion polymerization apparatus comprises a combination of fusion polymerization reactors selected from the group consisting of a first and a second vertical agitator reactor with a horizontal agitator reactor, a vertical agitator reactor with a thin film evaporator and a horizontal agitator reactor, and a vertical agitator reactor with a first and a second horizontal agitator reactor.

9. A method of producing a polycondensation resin comprising adding a polycondensation resin waste to a fusion polymerization apparatus, wherein the polycondensation resin waste is supplied from a polymerization reactor in which an oligomerization reaction is being performed to a reactor maintained at a temperature and a pressure effective to produce the polycondensation resin, wherein the polycondensation resin and the polycondensation resin waste are the same type of resin.

10. A method of producing a polycondensation resin comprising:
    melting a polycondensation resin waste,
    adding a raw material monomer, an oligomer, a catalyst, or a combination comprising one or more of the forgoing materials to the polycondensation resin waste, and
    adding the polycondensation resin waste to a fusion polymerisation apparatus maintained at a temperature and a pressure effective to produce the polycondensation resin, wherein the polycondensation resin and the polycondensation resin waste are the same type of resin.

11. The method of claim 10, wherein the fusion polymerization apparatus comprises more than one polymerization reactor connected in series.

12. The method of claim 11, wherein the fusion polymerization apparatus comprises a combination of fusion polymerization reactors selected from the group consisting of a vertical agitator and a horizontal agitator reactor, a horizontal agitator reactor and a vertical agitator reactor, a first horizontal agitator reactor and a second horizontal agitator reactor, a vertical agitator reactor with a vacuum reactor and a horizontal polymerization reactor, and a thin film evaporator with a first and a second horizontal agitator reactor.

13. The method of claim 11, wherein the fusion polymerization apparatus comprises a combination of fusion polymerization reactors selected from the group consisting of a first and a second vertical agitator reactor with a horizontal agitator reactor, a vertical agitator reactor with a thin film evaporator and a horizontal agitator reactor, and a vertical agitator reactor with a first and a second horizontal agitator reactor.

14. A method of producing a polycarbonate resin comprising adding a polycarbonate resin waste to a fusion polymerization apparatus maintained at a temperature and a pressure effective to produce the polycarbonate resin, wherein the polycarbonate resin and the polycarbonate resin waste are the same type of resin.

15. The method of claim 14, further comprising melting the polycarbonate resin waste prior to adding to the fusion polymerization apparatus.

16. The method of claim 15, further comprising adding a raw material monomer, an oligomer, a catalyst, or a combination of one or more of the foregoing materials to the melted polycarbonate resin waste prior to adding to the fusion polymerization apparatus.

17. The method of claim 14, wherein the polycarbonate resin waste is supplied from a reactor of the fusion polymerisation apparatus in which an oligomerization reaction is being performed.

18. The method of claim 1, wherein the polycarbonate resin waste is supplied to a polymerization reactor of the fusion polymerization apparatus in which a polycondensation reaction is being performed.

19. The method of claim 14, wherein the fusion polymerization apparatus comprises a polymerization reactor selected from the group consisting of a vertical agitator polymerization reactor, a thin film evaporator, a vacuum polymerization reactor, a horizontal agitator polymerization reactor, and a biaxial vented extruder.

20. The method of claim 14, wherein the fusion polymerization apparatus comprises more than one polymerization reactor connected in series.

21. The method of claim 20, wherein the fusion polymerization apparatus comprises a combination of fusion polymerization reactors selected from the group consisting of a vertical agitator reactor and a horizontal agitator reactor, a horizontal agitator reactor and a vertical agitator reactor, a first horizontal agitator reactor and a second horizontal agitator reactor, a vertical agitator reactor with a vacuum reactor and a horizontal polymerization reactor, and a thin film evaporator with a first and a second horizontal agitator reactor.

22. The method of claim 20, wherein the fusion polymerization apparatus comprises a combination of fusion polymerization reactors selected from the group consisting of a first and a second vertical agitator reactor with a horizontal agitator reactor, a vertical agitator reactor with a thin film evaporator and a horizontal agitator reactor, and a vertical agitator reactor with a first and a second horizontal agitator reactor.

23. The method of claim 14, wherein the polycarbonate resin comprises bisphenol A monomer units.

24. A method of producing a polycarbonate resin comprising adding a polycarbonate resin waste to a fusion polymerization apparatus, wherein the polycarbonate resin waste is supplied from a polymerization reactor in which an oligomerization reaction is being performed to a reactor maintained at a temperature and a pressure effective to produce the polycarbonate resin, wherein the polycarbonate resin and the polycarbonate resin waste are the same type of resin.

25. The method of claim 24, wherein the polycarbonate resin comprises bisphenol A monomer units.

26. A method of producing a polycarbonate resin comprising:

melting a polycarbonate resin waste, adding a raw material monomer, an oligomer, a catalyst, or a combination comprising one or more of the forgoing materials to the polycarbonate resin waste, and adding the polycarbonate resin waste to a fusion polymerization apparatus maintained at a temperature and a pressure effective to produce the polycarbonate resin, wherein the polycarbonate resin and the polycarbonate resin waste are the same type of resin.

27. The method of claim 26, wherein the fusion polymerization apparatus comprises more than one polymerization reactor connected in series.

28. The method of claim 27, wherein the fusion polymerization apparatus comprises a combination of fusion polymerization reactors selected from the group consisting of a vertical agitator and a horizontal agitator reactor, a horizontal agitator reactor and a vertical agitator reactor, a first horizontal agitator reactor and a second horizontal agitator reactor, a vertical agitator reactor with a vacuum reactor and a horizontal polymerization reactor, and a thin film evaporator with a first and a second horizontal agitator reactor.

29. The method of claim 27, wherein the fusion polymerization apparatus comprises a combination of fusion polymerization reactors selected from the group consisting of a first and a second vertical agitator reactor with a horizontal agitator reactor, a vertical agitator reactor with a thin film evaporator and a horizontal agitator reactor, and a vertical agitator reactor with a first and a second horizontal agitator reactor.

30. The method of claim 26, wherein the polycarbonate resin comprises bisphenol A monomer units.

* * * * *